US010818056B2

(12) United States Patent
DeLuca et al.

(10) Patent No.: US 10,818,056 B2
(45) Date of Patent: Oct. 27, 2020

(54) ENABLING CUSTOM MEDIA OVERLAY UPON TRIGGERING EVENT

(71) Applicant: International Business Machines Corporation, Armonk, NY (US)

(72) Inventors: Lisa Seacat DeLuca, Baltimore, MD (US); Jeremy A. Greenberger, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/109,852

(22) Filed: Aug. 23, 2018

(65) Prior Publication Data

US 2020/0066013 A1 Feb. 27, 2020

(51) Int. Cl.
| | | |
|---|---|---|
| *G06T 11/60* | (2006.01) | |
| *G06F 3/0482* | (2013.01) | |
| *H04B 5/00* | (2006.01) | |
| *G06F 3/0484* | (2013.01) | |
| *G06F 3/0488* | (2013.01) | |

(52) U.S. Cl.
CPC ........... *G06T 11/60* (2013.01); *G06F 3/0482* (2013.01); *G06F 3/04847* (2013.01); *H04B 5/0025* (2013.01); *G06F 3/04886* (2013.01); *G06T 2200/24* (2013.01)

(58) Field of Classification Search
CPC ... G06T 11/60; G06T 2200/24; G06F 3/0482; G06F 3/04847; G06F 3/04886; H04B 5/0025
USPC ......................................................... 715/753
See application file for complete search history.

(56) References Cited

U.S. PATENT DOCUMENTS

| | | | |
|---|---|---|---|
| 9,225,897 B1 | 12/2015 | Sehn | |
| 9,483,556 B1 * | 11/2016 | Cohen | ..................... G06F 16/51 |
| 9,813,642 B1 | 11/2017 | Chen et al. | |
| 2006/0200746 A1 * | 9/2006 | Kim | ....................... H04H 60/31 |
| | | | 715/234 |

(Continued)

OTHER PUBLICATIONS

Vaynerchuk, Gary, "How to Create and Use Snapchat's New Custom Geofilters", https://www.garyvaynerchuk.com/how-to-create-and-use-snapchats-new-custom-geofilters/, Jan. 10, 2018, 6 pgs.

(Continued)

*Primary Examiner* — Arpan P. Savla
*Assistant Examiner* — Henry Orr
(74) *Attorney, Agent, or Firm* — Maeve M. Carpenter; Maxine L. Barasch; Keohane & D'Alessandro, PLLC

(57) ABSTRACT

Disclosed embodiments provide techniques for managing custom media overlays for social media applications. Custom media overlays, sometimes referred to as "filters," "lenses," or "effects," can be used to augment a digital image, providing entertainment and increasing engagement in social media applications. In various situations, it may be desirable to reveal a custom media overlay only after an associated event has occurred. Disclosed embodiments allow a custom media overlay to be defined and associated with an event. Prior to the event occurrence, the custom media overlay is only available to a first subset of users. Once the event occurs, the custom media overlay is provided to a second subset of users. In this way, the custom media overlay is concealed from the second subset of users until the event occurs.

10 Claims, 9 Drawing Sheets

(56) References Cited

U.S. PATENT DOCUMENTS

| | | | |
|---|---|---|---|
| 2010/0023878 A1 | 1/2010 | Douris et al. | |
| 2014/0347386 A1* | 11/2014 | Hughes | G06T 11/60 345/619 |
| 2015/0172246 A1* | 6/2015 | Velummylum | H04L 51/18 709/206 |
| 2016/0004788 A1* | 1/2016 | Elgort | G06Q 30/0631 707/722 |
| 2016/0035074 A1* | 2/2016 | Jeong | G06T 11/60 382/282 |
| 2016/0085863 A1* | 3/2016 | Allen | G06Q 30/08 707/754 |
| 2016/0196584 A1 | 7/2016 | Franklin et al. | |
| 2016/0277419 A1 | 9/2016 | Allen et al. | |
| 2016/0292509 A1* | 10/2016 | Kaps | G06K 9/00718 |
| 2017/0250931 A1* | 8/2017 | Ioannou | H04L 51/02 |
| 2017/0263029 A1* | 9/2017 | Yan | G06F 3/04842 |
| 2018/0191797 A1* | 7/2018 | Javier | H04L 67/2804 |
| 2018/0191962 A1* | 7/2018 | Javier | G06F 3/0482 |
| 2018/0246983 A1* | 8/2018 | Rathod | G06F 3/0482 |
| 2019/0095436 A1* | 3/2019 | Martinazzi | G06T 11/60 |

OTHER PUBLICATIONS

Tran, Kevin, "Snapchat rolls out audience-based targeting for filters", http://www.businessinsider.com/snapchat-rolls-out-audience-based-targeting-for-filters-2017-11, Nov. 16, 2017, 2 pgs.

Jaymie, "Sofia the First—themed Birthday Party SnapChat Filter", https://www.thesnapshop.net/listing/513658047/sofia-the-first-themed-birthday-party, Jan. 11, 2018, 2 pgs.

Laughing Dutchman, The, "LogoLicious: Add your own logo, watermark,and text to photos", https://play.google.com/store/apps/details?id=com.olav.logolicious&hl=en, Jan. 20, 2018, 3 pgs.

Legendre, Franck, "How Google Nearby (really) works—and what else it does?", http://blog.p2pkit.io/how-google-nearby-really-works-and-what-else-it-does/, Aug. 30, 2015, 10 pgs.

Anonymous, "Method and System for Creating Dynamic Image and Video Filters using Internet of Things (IoT) Sensing Data", IP.com Prior Art Database Technical Disclosure, IPCOM000250677D, Aug. 20, 2017, 4 pgs.

Flynn, Kerry, "Snapchat quietly released new filters based on objects you're snapping", http://mashable.com/2017/11/26/snapchat-new-filters-based-on-what-youre-snappingpets/#_2anL10o_Oq3, Nov. 26, 2017, 3 pgs.

Kosoff, Maya, "Snapchat is on track to generate $100 million in revenue", http://www.businessinsider.com/snapchat-is-on-track-to-generate-100-mil, Oct. 1, 2015, 3 pgs.

Bell, Karissa, "Facebook is putting its latest Snapchat clone front and center", http://mashable.com/2017/03/28/facebook-camera-stories/#OzAWghsVSiqq, Mar. 28, 2017, 2 pgs.

Unknown, "Create.Snapchat.com", https://create.snapchat.com/org/guest/purchase/choose-product, Jun. 18, 2018, 1 pg.

* cited by examiner

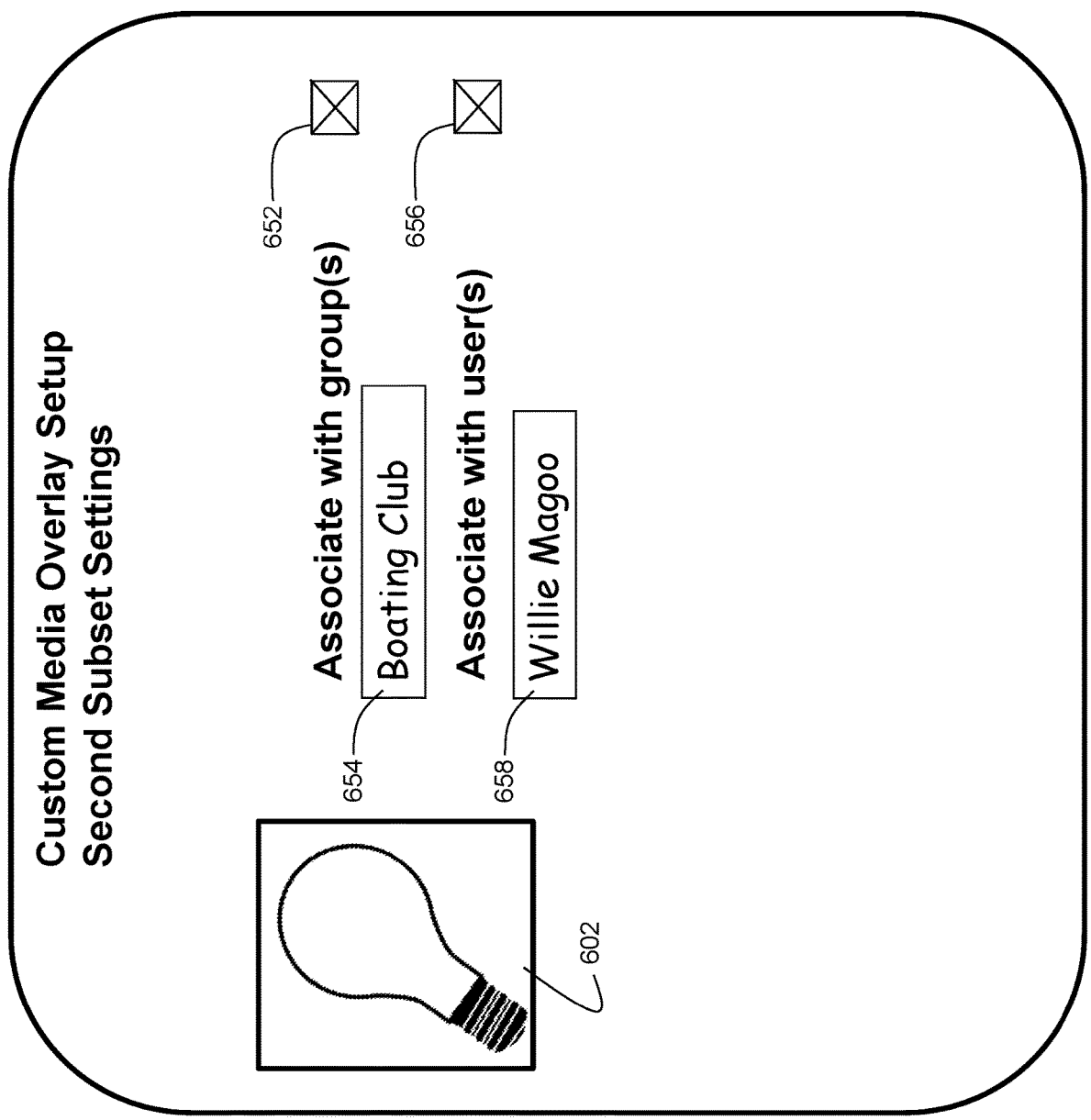

ENABLING CUSTOM MEDIA OVERLAY UPON TRIGGERING EVENT

FIELD

Embodiments of the invention relate to enabling custom media overlay in response to a triggering event.

BACKGROUND

Many social media systems have filter, lenses, or effect functionalities that allow a user to augment a photograph posted to the system. The filter (lens or effect) is a frame, object, text, or other media item that is overlaid onto the photo. In some cases, the filter may also make changes to the content of the photo, such as by distorting the faces in the images to change their shape. These enhance the entertainment of, and increase engagement in, social media applications. It is, therefore, desirable to have improvements in the use and management of filters.

SUMMARY

In one embodiment, there is provided a computer-implemented method comprising: defining a custom media overlay for a social media application; associating the custom media overlay with an event; determining a first subset of users associated with the custom media overlay; determining a second subset of users associated with the custom media overlay; providing the custom media overlay to the first subset of users prior to occurrence of the event; detecting occurrence of the event; and in response to occurrence of the event, providing the custom media overlay to the second subset of users.

In another embodiment, there is provided an electronic computing device comprising: a processor; a memory coupled to the processor, the memory containing instructions, that when executed by the processor, perform steps of: defining a custom media overlay for a social media application; associating the custom media overlay with an event; determining a first subset of users associated with the custom media overlay; determining a second subset of users associated with the custom media overlay; providing the custom media overlay to the first subset of users prior to occurrence of the event; detecting occurrence of the event; and in response to occurrence of the event, providing the custom media overlay to the second subset of users.

In yet another embodiment, there is provided a computer program product for an electronic computing device comprising a computer readable storage medium having program instructions embodied therewith, the program instructions executable by a processor to cause the electronic computing device to: define a custom media overlay for a social media application; associate the custom media overlay with an event; determine a first subset of users associated with the custom media overlay; determine a second subset of users associated with the custom media overlay; provide the custom media overlay to the first subset of users prior to occurrence of the event; detect occurrence of the event; and in response to occurrence of the event, provide the custom media overlay to the second subset of users.

BRIEF DESCRIPTION OF THE DRAWINGS

Features of the disclosed embodiments will be more readily understood from the following detailed description of the various aspects of the invention taken in conjunction with the accompanying drawings.

FIG. 6A and FIG. 6B show an exemplary user interface for associating a custom media overlay with a triggering event.

Figure 1:
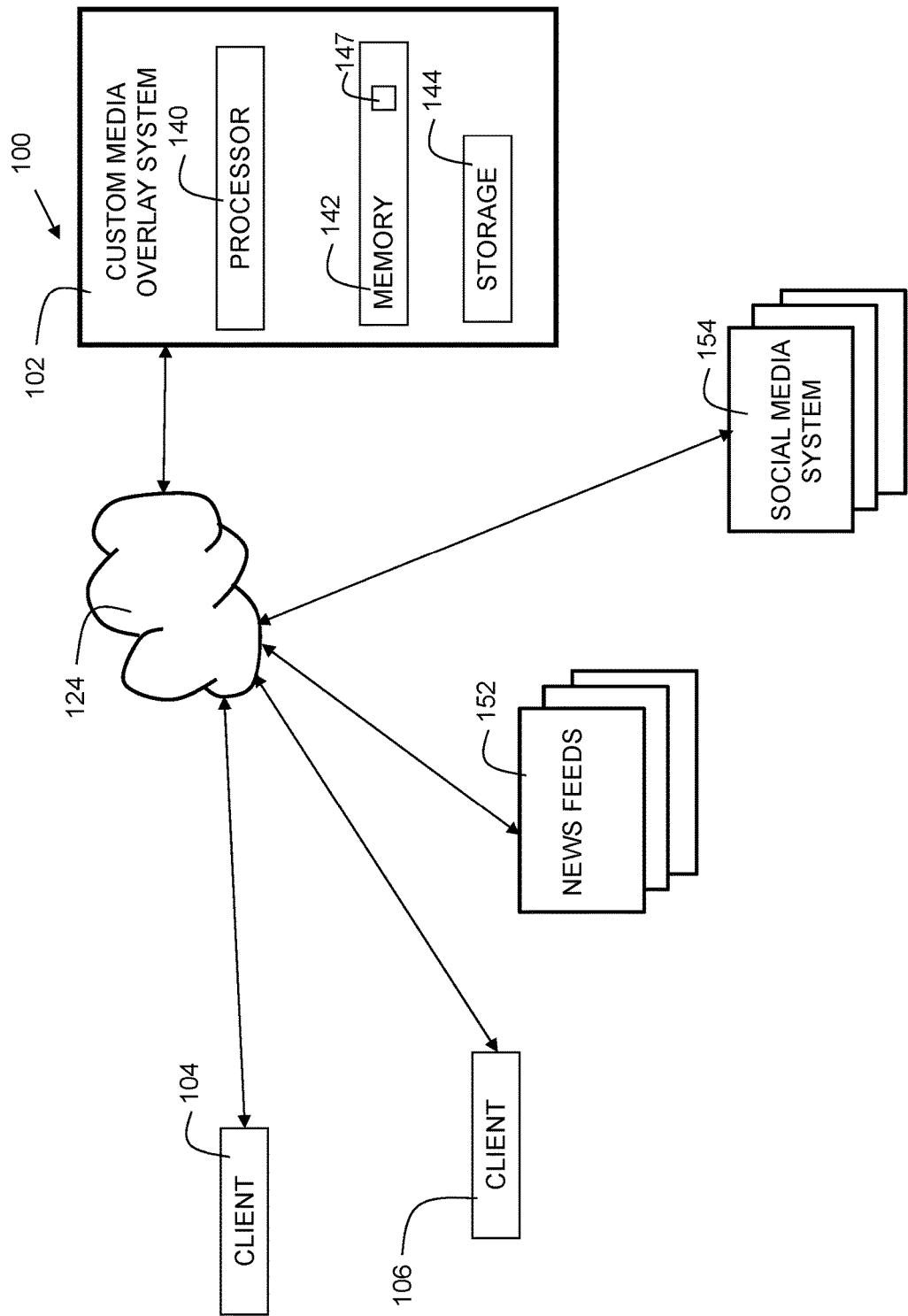
FIG. 1 is a diagram for an environment of embodiments of the present invention.

The drawings are not necessarily to scale. The drawings are merely representations, not necessarily intended to portray specific parameters of the invention. The drawings are intended to depict only example embodiments of the invention, and therefore should not be considered as limiting in scope. In the drawings, like numbering may represent like elements. Furthermore, certain elements in some of the Figures may be omitted, or illustrated not-to-scale, for illustrative clarity.

DETAILED DESCRIPTION

Disclosed embodiments provide techniques for managing custom media overlays for social media applications. Custom media overlays, sometimes referred to as "filters," "lenses," or "effects," can be used to augment a digital image, providing entertainment and increasing engagement in social media applications. In various situations, it may be desirable to reveal a custom media overlay only after an associated event has occurred. Disclosed embodiments allow a custom media overlay to be defined and associated with an event. Prior to the event occurrence, the custom media overlay is only available to a first subset of users. Once it is detected that the event occurs, the custom media overlay is provided to a second subset of users. In this way, the custom media overlay is concealed from the second subset of users until the event occurs.

An example use case for disclosed embodiments includes a surprise party for a user. In such a scenario, it is desirable that the user for which the party is being held does not see any custom media overlays that could possibly hint at the surprise party. In this example, the triggering event can be a first use of the custom media overlay by a member of the first subset of users. Once the custom media overlay is used, it then becomes available to the second subset of users, which may include all users of a social media system. In such an example, the user who creates, purchases, and/or registers the custom media overlay within a social media system may be one of the first subset of users, serving in an administrator capacity for the custom media overlay. Once s/he uses the custom media overlay (e.g., after the surprise party guest has arrived and learns about the party), the custom media overlay is then published to (i.e., made available in user accounts of) the second subset of users for them to use on images they may post.

In some embodiments, detecting an occurrence of the event (i.e., the triggering event) comprises detecting an indication from one or more of the first subset of users. The indication can include a member of the first subset of users invoking a user interface control to publish the custom media overlay to make it available to the second subset of users. In some embodiments, a member of the first subset of users may utter a phrase (e.g., "make it live"), which is detected by the user's mobile device, converted from speech to text, and used as the triggering event to make the custom media overlay available to the second subset of users.

In some embodiments, the triggering event can be the detection of a subject person in proximity to another user of the social media system. This can be inferred from near field communication signals between a mobile device of the subject person and a mobile device of the other user sensing one another. When the subject person is within a predetermined distance from another user, the custom media overlay may then be published for users to select.

In some embodiments, a news feed or social media feed event can be the triggering event. Examples can include a sports team score, a stock price reaching a predetermined price threshold, a party announcement, and/or weather conditions. In some embodiments, a custom media overlay can be "pre-staged" such that it is ready to be presented in the case that the event occurs. For example, a particular custom media overlay can be made available if and only if a particular sports team wins its game. By monitoring a news feed and retrieving team score information (e.g., by scraping, using APIs, or other suitable technique), disclosed embodiments can enable the custom media overlay if and only if the team wins. If that team ends up not winning its game, the custom media overlay is not presented. These and other usage scenarios are enabled by disclosed embodiments as further described below.

Reference throughout this specification to "one embodiment," "an embodiment," "some embodiments", or similar language means that a particular feature, structure, or characteristic described in connection with the embodiment is included in at least one embodiment of the present invention. Thus, appearances of the phrases "in one embodiment," "in an embodiment," "in some embodiments", and similar language throughout this specification may, but do not necessarily, all refer to the same embodiment.

Moreover, the described features, structures, or characteristics of the invention may be combined in any suitable manner in one or more embodiments. It will be apparent to those skilled in the art that various modifications and variations can be made to the present invention without departing from the spirit and scope and purpose of the invention. Thus, it is intended that the present invention cover the modifications and variations of this invention provided they come within the scope of the appended claims and their equivalents. Reference will now be made in detail to the preferred embodiments of the invention.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. The term "set" is intended to mean a quantity of at least one. It will be further understood that the terms "comprises" and/or "comprising", or "includes" and/or "including", or "has" and/or "having", when used in this specification, specify the presence of stated features, regions, integers, steps, operations, elements, and/or components, but do not preclude the presence or addition of one or more other features, regions, and/or elements.

FIG. 1 is a diagram for an environment of embodiments of the present invention. A custom media overlay system 102 may include a processor 140, memory 142, and storage 144. The processor 140 is coupled to the memory 142 such that it can access instructions 147 stored in memory 142. The processor 140 executes the instructions 147, stored in memory 142, in implementation of embodiments of the present invention. The storage 144 may include one or more hard disks, or other suitable storage technology. Custom media overlay system 102 is an electronic computing device. Note that while one such device is illustrated in diagram 100, in practice, there may be multiple electronic computing devices 102 operating in a distributed manner for load balancing and data redundancy. In embodiments, custom media overlay system 102 may implement an object store system utilizing a cloud-based architecture.

The custom media overlay system 102 is connected to network 124. Network 124 may be the Internet, a wide area network, a local area network, or any other suitable network. Also connected to the network are client devices 104 and 106, as well as news feeds 152 and social media systems 154. The client devices may be smartphones, smartwatches, tablet computers, laptop computers, or any other suitable mobile and/or wearable device now known or hereafter developed. The client devices may have GPS or another geolocation receiver for determining the user's location. The client devices may also have Bluetooth®, Wi-Fi, or other suitable communication interface to determine the location of nearby users.

News feeds 152 are in the form of news websites, streams, sports websites, etc. that report new information, which may be considered "news." Example news feeds include Fox News website, CNN website, ESPN website, and other websites. Other news feeds include the Associated Press, Reuters, etc. These feeds may include text, photos, video, etc. The feeds may be scraped by custom media overlay system 102. Alternatively, the server may retrieve information from the feeds from one or more APIs provided by the feeds.

Social media systems 154 are systems which allow users to start accounts, and connect their accounts to other accounts for information sharing. Each user account has an account feed where his/her own posts appear, as well as another data feed that displays the posts of other accounts connected to the user account. When a user shares or posts text, images, videos, etc. to his/her account, it may appear in the data feed of other user's accounts. Example systems include Facebook®, LinkedIn®, Snapchat®, and Twitter®. The feeds may be scraped by custom media overlay system 102.

Figure 2:
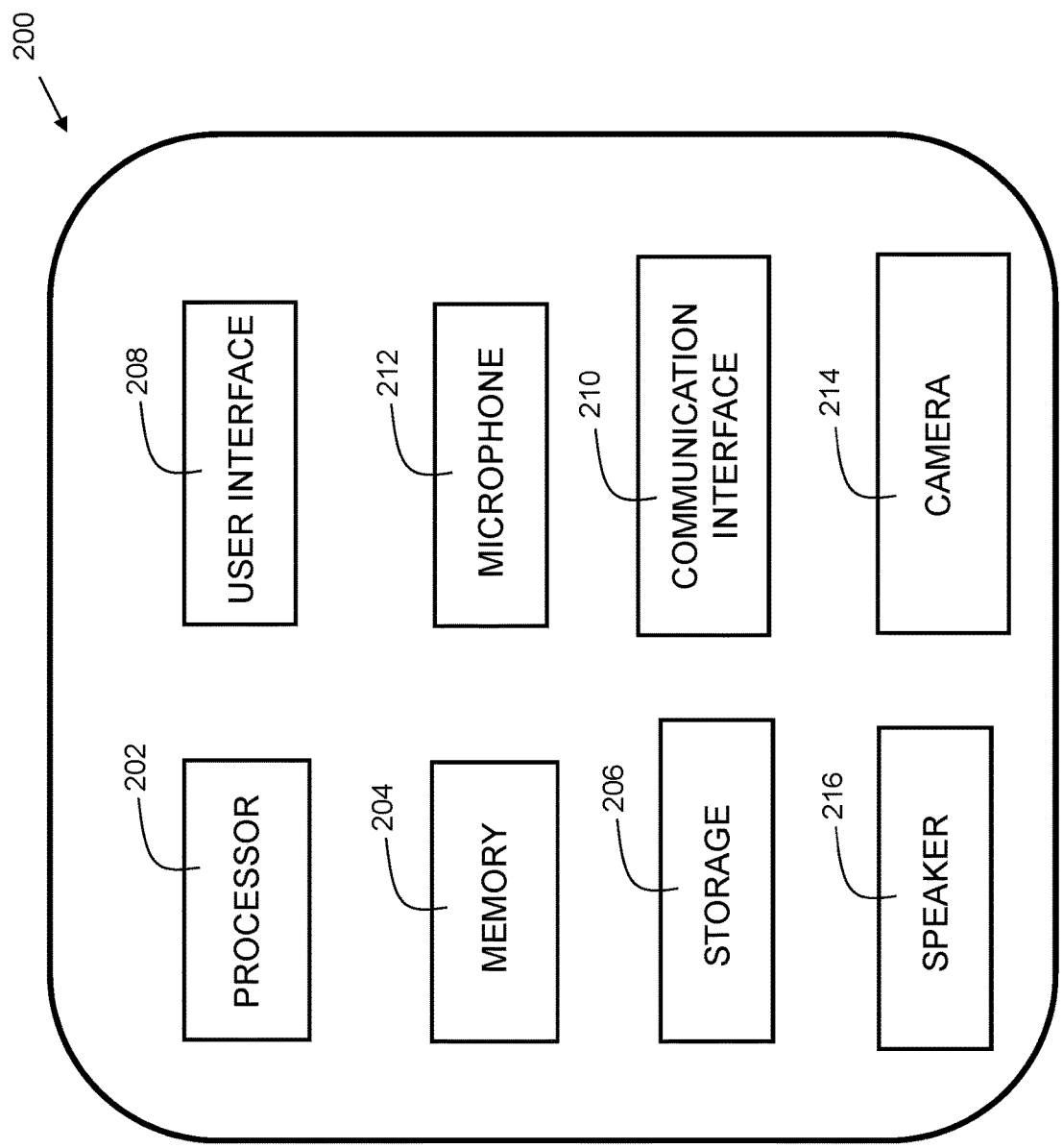
FIG. 2 is a client device in accordance with embodiments of the present invention.

FIG. 2 is a client device 200 in accordance with embodiments of the present invention. The client device 200 may be a mobile device, such as a smartphone or wearable device. Device 200 includes a processor 202, which is coupled to a memory 204. Memory 204 may include dynamic random access memory (DRAM), static random access memory (SRAM), magnetic storage, and/or a read only memory such as flash, EEPROM, optical storage, or other suitable memory. In some embodiments, the memory 204 may not be a transitory signal per se. Memory 204 stores instructions, which when executed by the processor, implement the steps of the present invention.

Device 200 may further include storage 206. In embodiments, storage 206 may include one or more magnetic storage devices such as hard disk drives (HDDs). Storage 206 may additionally include one or more solid state drives (SSDs).

Device 200 further includes a user interface 208. This may include a display, keyboard, mouse, or other suitable interface. In some embodiments, the display may be touch-sensitive.

The device 200 further includes a communication interface 210. The communication interface 210 may be a wired communication interface that includes Ethernet, Gigabit Ethernet, or the like. In embodiments, the network interface 210 may include a wireless communication interface that includes modulators, demodulators, and antennas for a variety of wireless protocols including, but not limited to, Bluetooth™, Wi-Fi, and/or cellular communication protocols for communication over a computer network.

The device 200 may further include a microphone 212 for receiving audio input. The device 200 may further include a camera 214. The camera may include a flash. The device 200 may further include a speaker 216. The speaker may be powered or passive.

Figure 3:
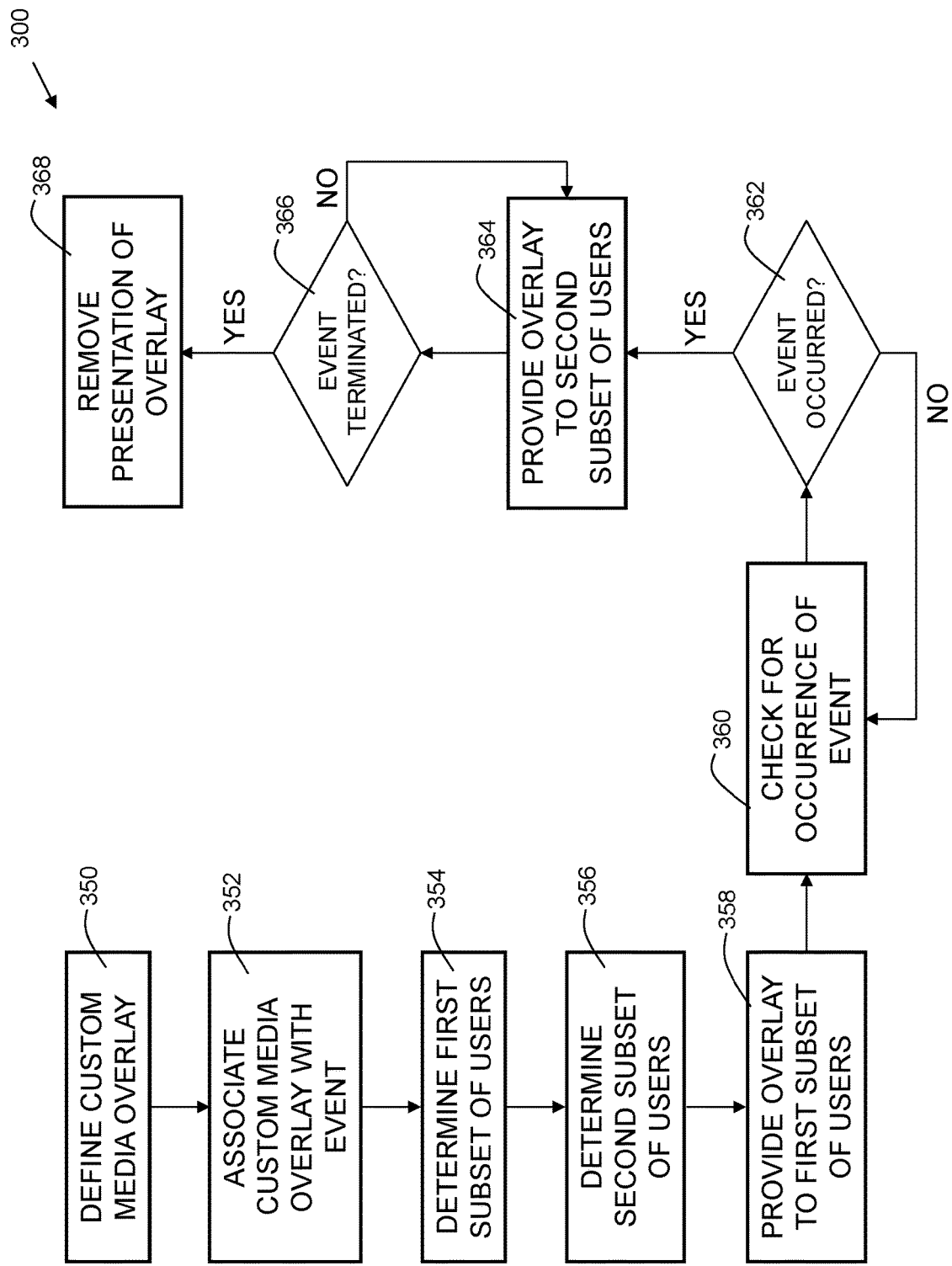
FIG. 3 is a flowchart for embodiments of the present invention.

FIG. 3 is a flowchart 300 for embodiments of the present invention. At 350, a custom media overlay is defined. A custom media overlay is a frame, object, and/or text, etc., that is to be overlaid onto a photo posted to a social media system, such as system 154 of FIG. 1. In this context, an object is a virtual object such as cat ears, a balloon, etc. A frame is a virtual object that may extend around the edge of the photo. In some cases, the custom media overlay may also make changes to the content of the photo, such as by distorting the faces in the images to change their shape, edits to the coloring or brightness, etc. The custom media overlay may be created by a user from elements provided by the social media system. For example, the social media system may provide various virtual objects (i.e., an umbrella, rabbit ears, a lightbulb, etc.) from which the user may select, and/or a field for text to be entered.

At 352, the custom media overlay is associated with an event. In some embodiments, the event may be a predetermined duration of time, such as three days, or five hours from the set-up. In some embodiments, the event may be a weather event, such as the temperature dipping below 32 degrees Fahrenheit, or a blizzard in the area. In some embodiments, the event may be a subject person coming into proximity of the user as determined from the user's client device and the subject person's client device in communication with one another. The proximity could be that the user and the subject person are within 10 feet of one another, or are in the same venue, etc. In some embodiments, the event may be detection of the client device (and hence, the user) being in a particular location, as determined from, for instance, GPS or other location-tracking system, on the client device. These events are examples, and any suitable event is included within the scope of the invention.

At 354, a first subset of users is determined. These are the users for which the custom media overlay will be available prior to the occurrence of the event. In an example, the user may specify the profiles (i.e., accounts) of his mother, brother, and sister when the custom media overlay relates to his father's upcoming surprise birthday party. Accordingly, until the event occurs, his father and users other than his mother, brother, and sister will not be able to access the custom media overlay. Until the event, the user, as well as his mother, brother, and sister will have the photo in their profile feed showing the overlay as available, whereas the photo will show up without the overlay available in everyone else's profile feeds until the triggering event occurs. In some embodiments, the triggering event may be the first use (i.e., selection for application to a photo posted to his/her account feed) of the custom media overlay by one or more of a first subset of users.

At 356, a second subset of users is determined. These are the users for which the custom media overlay will be available after (i.e., in response to) the occurrence of the event. In some embodiments, after the occurrence of the event, the custom media overlay is made "public," meaning anyone that can access, via the Internet, the user's social media profile. In some embodiments, the custom media overlay is made available to "connections" or "friends", meaning anyone whose profiles are connected with the profile of the user. In some embodiments, the custom media overlay is made available to users based on the privacy settings for the user's profile, such as "public," "friends of friends," "friends," "only me," etc. In some embodiments, the custom media overlay is made available to a custom set of users, the profiles of which the user designates, for example, by selecting a checkbox for each profile on a user interface, pressing the photos of each selected profile on a touch screen, or filling in a field (e.g., at FIGS. 6A and 6B).

In some embodiments, the first subset of users is created by starting with a list of the second subset of users and removing one or more users from that list. This embodiment can be useful for a surprise party. As an example, consider a surprise anniversary party for a couple. In such a scenario, it may be desirable to start with an entire group, and then remove the two users that comprise the couple. In this way, it is convenient to define the first subset of users as containing the entire group minus the two people that comprise the couple. In this way, for example, members of "family group" or "school friends" may be selected. This may automatically select all profiles for the members of that group. The user can then deselect certain members by clicking on profile photos or check boxes associated with the user accounts, etc.

At 358, the custom media overlay is provided to the first subset of users. This is before the occurrence of the event. Then, at 360, a check is made for the occurrence of the event. The check may include embodiments checking data that was scraped from a news feed 152 or a social media system 154 (FIG. 1).

In some embodiments, detecting the occurrence of the event comprises detecting use of the custom media overlay by one or more of the first subset of users. If one or more of the first subset of users accesses the custom media overlay, and uses it on (applies it to) a photo, this can be an event, and trigger the detection thereof.

In some embodiments, detecting the occurrence of the event comprises detecting an event from a news feed. The news feeds 152 may be scraped by custom media overlay system 102 (FIG. 1). For example, an "icicle" custom media overlay may be made available if the outside temperature falls below 32 degrees Fahrenheit in the user's location (as determined by GPS in conjunction with online weather data, or other suitable systems).

In some embodiments, detecting the occurrence of the event comprises detecting a subject person within a predefined proximity to one of the first subset of users. The proximity may be determined based on a check-in, near-field communication signals, a scrape of manual posts on social media systems 154 (FIG. 1), etc.

In some embodiments, detecting a subject person within a predefined proximity is based on a social media reporting function. If a user "checks in" to a certain location where another user is located, it may be detected that the subject person is within a predefined proximity to the user of the first subset. Some social media sites include functionality to allow users to "check in" to a location. The user's phone may have GPS, such that the social media system may determine the user's location. Users who want to broadcast their location to their friends on the social media system tap a "check-in" button on a user interface in the social media system. In response to that, the social media system presents a list of places nearby as determined by GPS, and then the user selects the place that matches where he/she is. An indication of the user's location then appears on a feed in the user's account as an update which people with accounts connected to the user's account can see. In some embodiments, the predefined proximity ranges from one foot to ten feet.

In some embodiments, detecting a subject person within a predefined proximity is based on near field communication signals and/or geolocation signals (e.g., Global Positioning System, GLONASS, Beidou, Galileo, or the like). When client devices have Bluetooth®, Wi-Fi, and/or other wireless connectivity, they can detect client devices belonging to other users nearby. The detection may be a client device of one of the first subset of users detecting another client device belonging to the subject person. For example, Paul and Martha are in a band together. If the client device of user Paul detects that the client device of subject person Martha is in the same house, a custom media overlay, previously selected by Paul, including a musical note, is made available since it is assumed they are in the house together, and there may likely be opportunities for taking photos that include both Paul and Martha together.

At 362, it is determined, based on the check, whether the event occurred. If not, the process is returned to block 360. If instead yes, then the process proceeds to block 364, where an overlay is provided to a second subset of users. At 366, it is determined whether the event is terminated. If not, the process continues to block 364. If instead yes, the process proceeds to block 368 where the presentation of the overlay is removed.

Embodiments may include a favorites list for custom media overlays. A number of selections of the custom media overlay may be determined when the subject person is in proximity to the user. In some embodiments, this can create an automatic association between one or more users. In some embodiments, after a custom media overlay is used with a subject person for a predetermined number of times, the custom media overlay system (102 of FIG. 1) creates an association between the subject person and the custom media overlay. As an example, if the custom media overlay is used with the same subject person on four different occasions, the custom media overlay becomes associated with that subject person.

Thus, the custom media overlay may be associated with the subject person in response to the number of selections exceeding a predetermined threshold. In response to the custom media overlay being used multiple times, a suggestion is made to the user to add the custom media overlay to a favorites list. In embodiments, the suggestion is provided to the user via an electronic display.

Accordingly, embodiments may include detecting a subject person within a predefined proximity to one of the first subset of users, recording a number of selections of the custom media overlay while in proximity, associating the custom media overlay with the subject person in response to the number of selections exceeding a predetermined threshold, and in response to the association, providing, via an electronic display, a suggestion to add the custom media overlay to a favorites list.

Embodiments may include removing the custom media overlay in response to determining that the subject person is no longer within the predefined proximity to one of the first subset of users. Accordingly, in an example, a custom media overlay is added in response to a subject person being in proximity to the user. When the subject person leaves the area, and is no longer in proximity to the user, the custom media overlay is removed from availability.

Figure 4B:
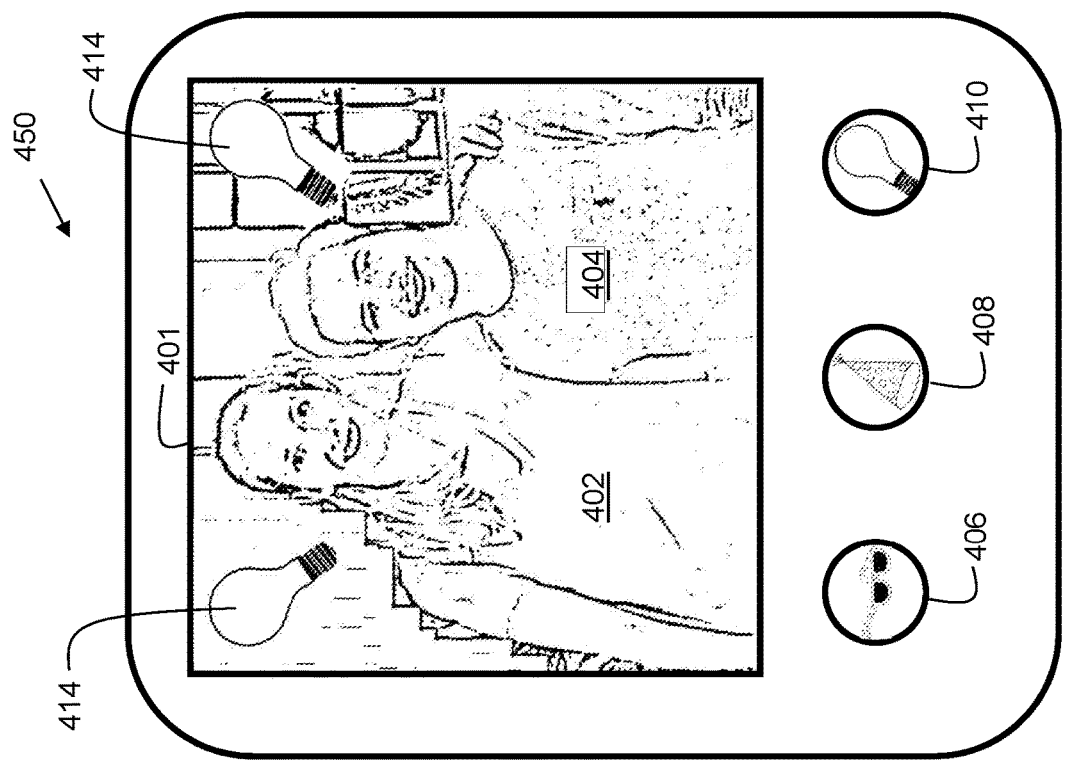
FIG. 4A, FIG. 4B, and FIG. 4C show example use cases based on proximity.
Figure 4A:
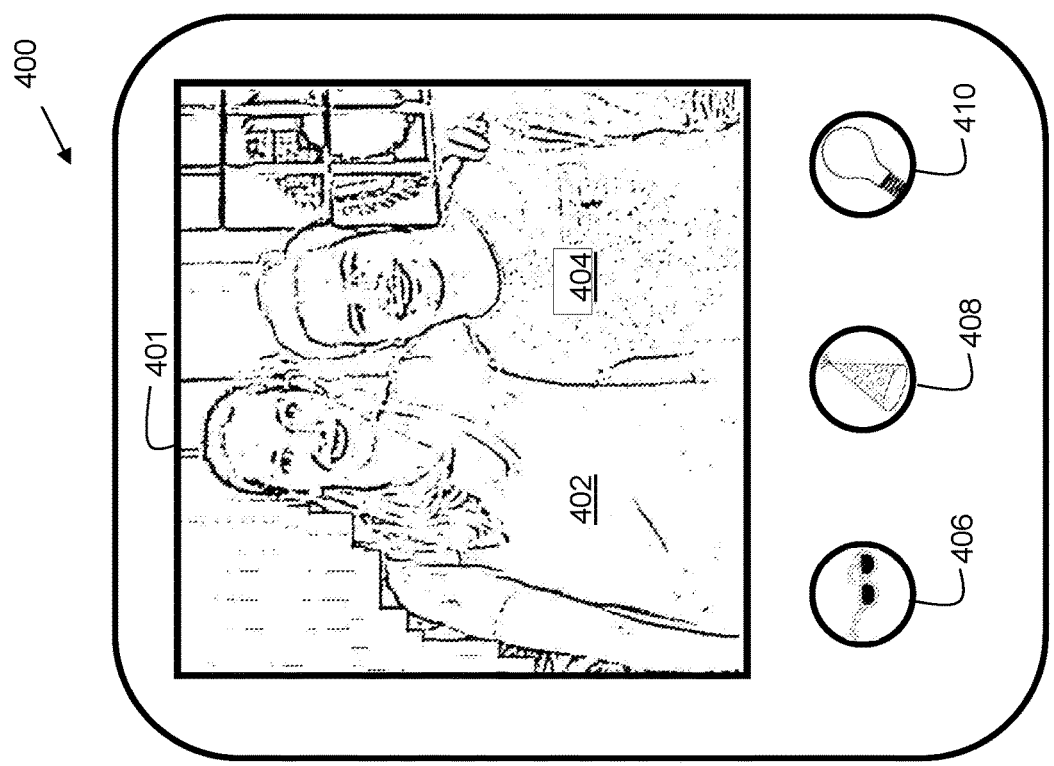
Figure 4C:
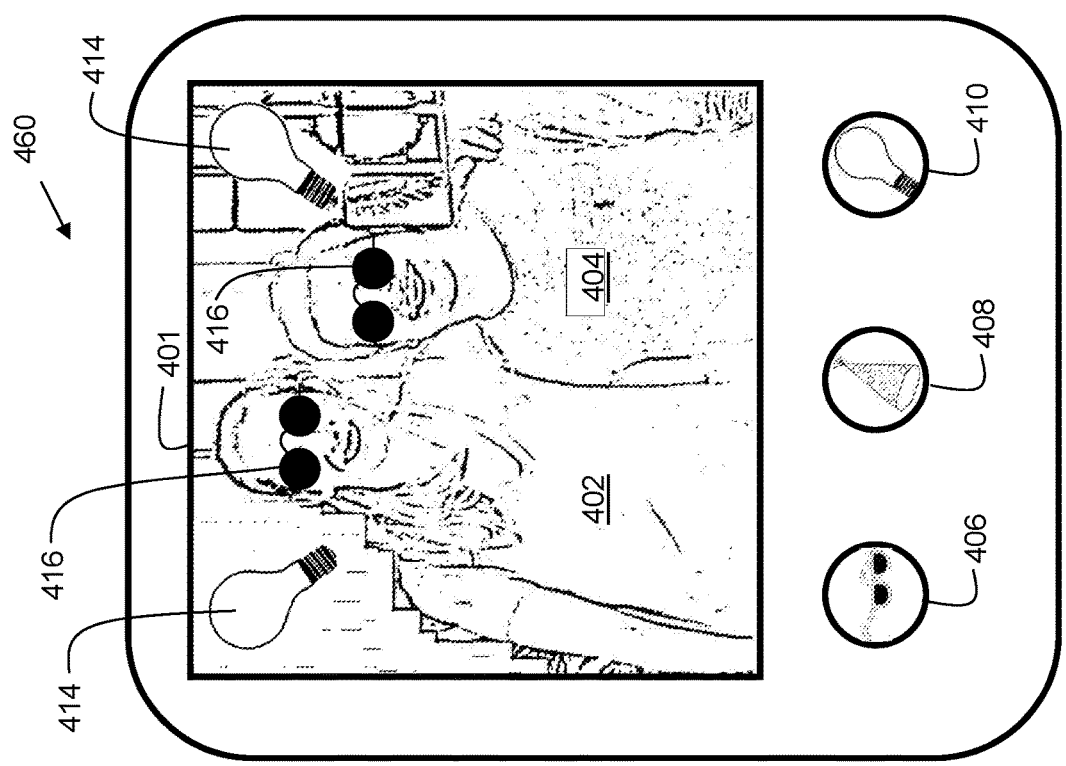

FIG. 4A, FIG. 4B, and FIG. 4C show example use cases based on proximity. Mobile electronic device touch-sensitive screen 400 shows a user interface having a photo 401 of a first person 402 and a second person 404. Initially, a lightbulb custom media overlay 410 is available to a first subset of users including an administrator user (the user who created the custom media overlay). Since the event of first person 402 being in proximity to the second person 404 is detected to have occurred (e.g., as detected from near field communication signals between mobile devices), a lightbulb custom overlay associated with such event is made available to the second subset of users. The second subset of users includes additional users beyond the first subset of users. Therefore, in the example, among the custom media overlays from which the second subset of users can select, a lightbulb is added, resulting in a group of choices including sunglasses 406, party hat 408, and lightbulb 410. A user in the second subset chooses the lightbulb custom media overlay by selecting lightbulb 410. The user may select it by pressing on the touch-sensitive screen with his/her finger or a stylus.

In FIG. 4B. mobile electronic device screen 450 shows the user interface having the selected custom media overlay applied at 414. As shown, there are two lightbulbs 414, one in each of the upper right corner and upper left corner of the photo 401. Accordingly, the custom media overlay was available to the first subset of users until an occurrence of the event, when the second subset of the users were then provided with access to the custom media overlay.

In embodiments, more than one custom media overlay may be applied to an image, wherein at least one of the custom media overlays is available based on the occurrence of an event. As shown in FIG. 4C, mobile electronic device screen 460 shows photo 401 with both the lightbulb 410 at 414 and the sunglasses 406 at 416 applied.

Figure 5B:
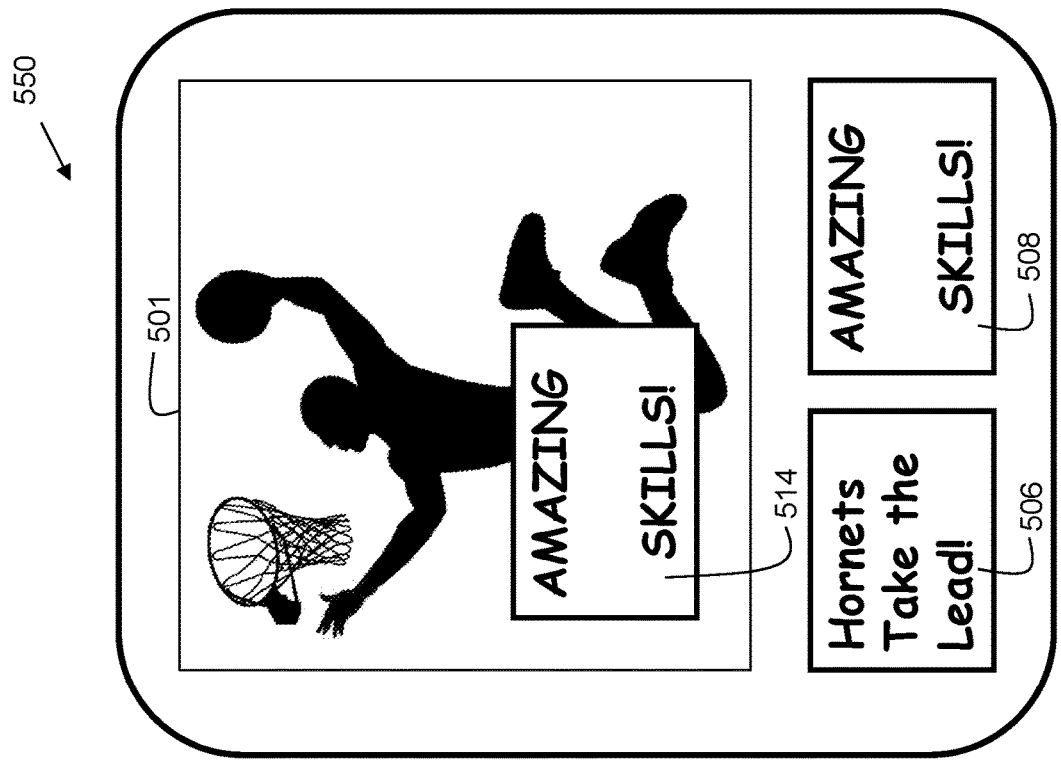
FIG. 5A and FIG. 5B show an example use case based on news feed data.
Figure 5A:
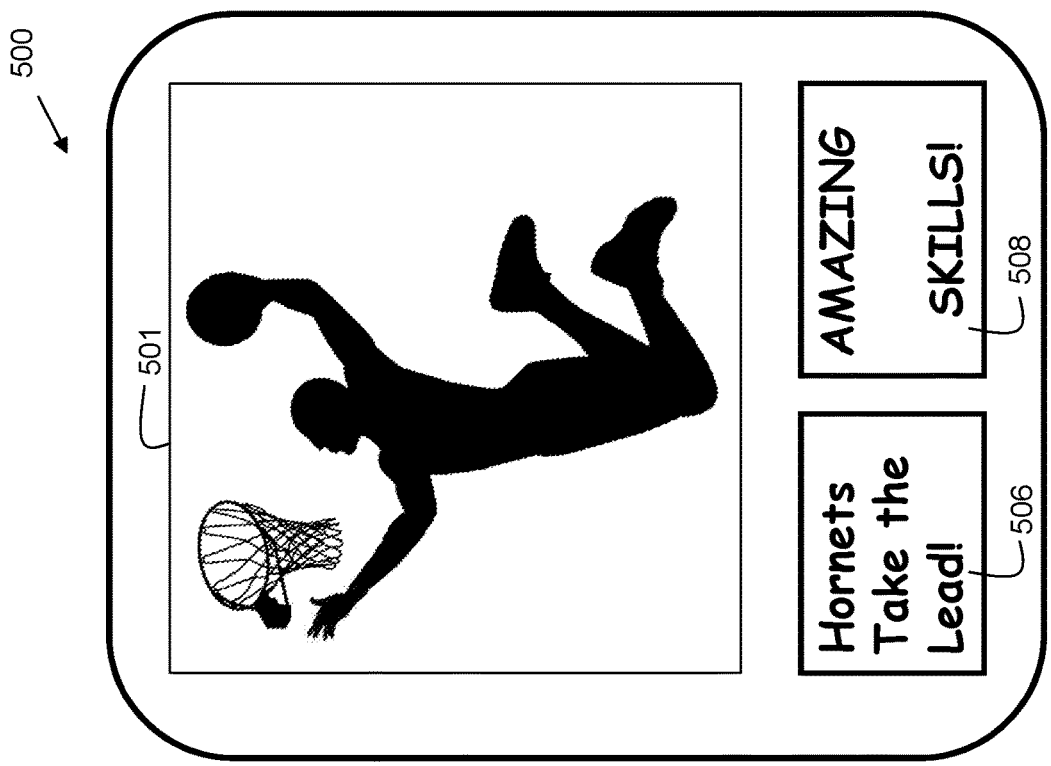

FIG. 5A and FIG. 5B show an example use case based on news feed data. Mobile device screen 500 shows a user interface having an image 501 of a person dunking a basketball into a hoop. Since the event of the Hornets team winning is detected to have occurred, two custom media overlays associated with that event are displayed from which the user can select "Hornets Take the Lead" 506, and "Amazing Skills!" 508. The user chooses the "Amazing Skills!" custom overlay by selecting 508. The user may select it by pressing on the touch-sensitive screen with his/her finger or a stylus. Mobile device screen 550 shows the image 501 having the selected custom media overlay applied to the image 501 at location 514. As shown, an image containing the text "Amazing Skills!" appears at the lower left corner of the image 501. The custom media overlay was available to the first subset of users until an occurrence of the event, when the second subset of the users were then provided with access to the custom media overlay. In this example, the first subset of users may be the administrator(s) of a basketball team social media account, and the second subset of users may be fans that follow the basketball team on the social media account.

Figure 6A:
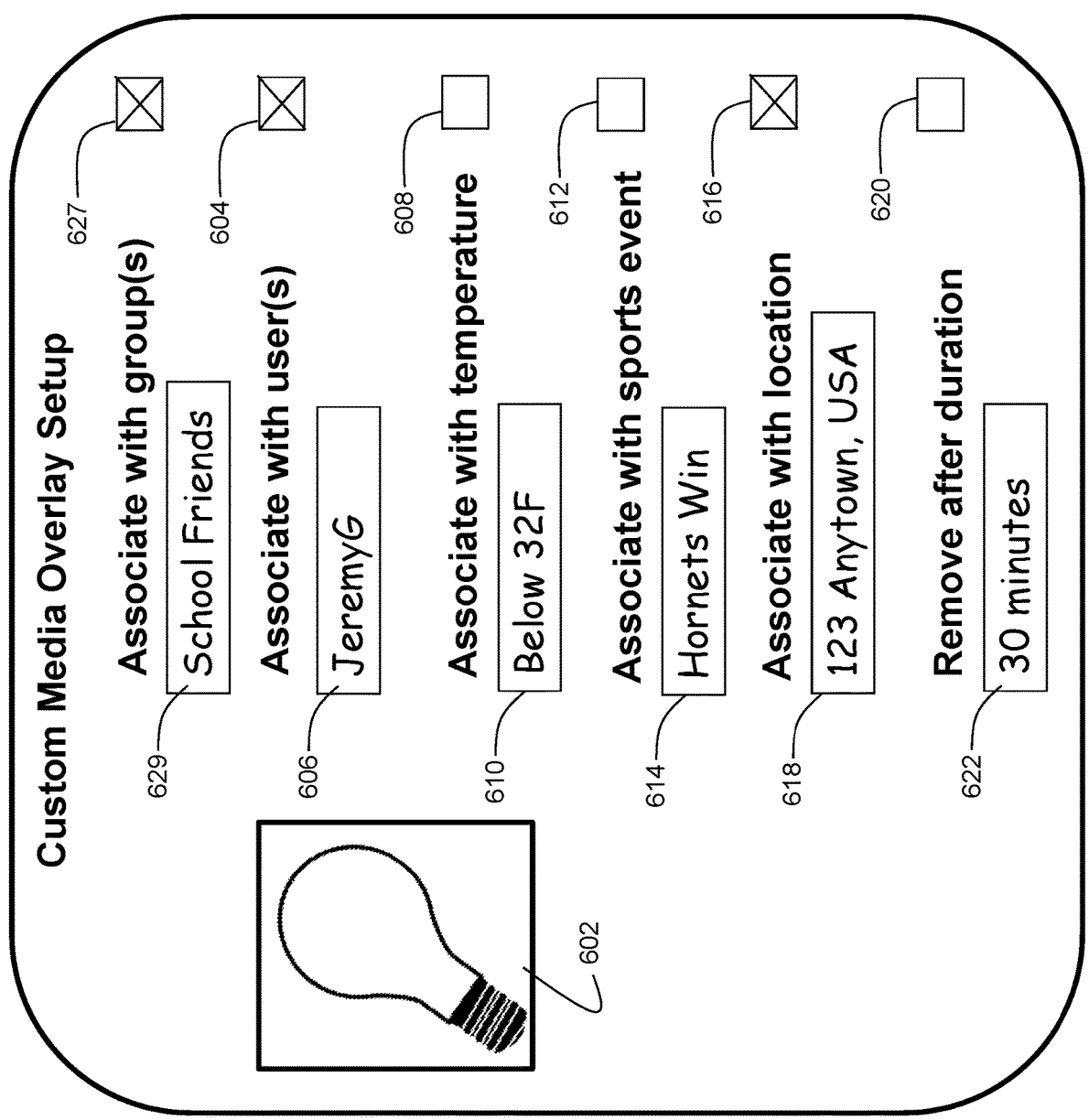

FIG. 6A is an exemplary user interface 600 for associating a custom media overlay with a triggering event. In the example, the custom media overlay selected or created by the user is a lightbulb image 602. Such a custom media overlay may be associated with an event relating to proximity to another person (as detected by proximity to an associated electronic mobile device, facial recognition, or other suitable technique), reaching of a temperature, a sports event, or a presence in a location.

In the example, on the user interface 600, the user is presented with checkbox 604 to associate the custom media overlay with another person. The user is presented with field 606 in which the user may enter a user identifier. The user identifier may be a name, phone number, email address, etc. In the example, checkbox 604 is shown selected, and JeremyG is the identifier for the subject person. The event therefore occurs when it is detected that the other person is in proximity to the user. This may be determined from near field communication between the user's client device and the subject person's client device.

The user interface 600 may present checkbox 608 to associate the custom media overlay with a temperature. The user is presented with field 610 in which the user may enter a temperature. In the example, checkbox 608 is shown unselected. A temperature of "Below 32 F" has been entered into field 610, but is not active since the corresponding checkbox is not selected. If it were selected though, the event would occur when it is detected that the selected temperature is reached. This may be determined by embodiments scraping news feeds 152 (FIG. 1) for weather information.

The user interface 600 may present checkbox 612 to associate the custom media overlay with a sports event. The user interface may present field 614 in which the user may enter a sports event identifier. In the example, checkbox 612 is shown unselected. A sports event of "Hornets Win" has been entered into field 614, but is not active since the corresponding checkbox is not selected. If it were selected though, the event would occur when it is detected that the Hornets team won a game. This may be determined by embodiments scraping news feeds 152 (FIG. 1).

The user interface 600 may present checkbox 616 to associate the custom media overlay with a location. The user interface 600 may present field 618 in which the user may enter a location identifier. The location identifier may be an address, the name of a known location (such as "Mall of America), latitude/longitude coordinates, etc. In the example, checkbox 616 is shown selected, and 123 Anytown, USA is the identifier for the location. The event therefore occurs when it is detected that the user is in the location. This may be determined from GPS or other location-detecting software, which may be on the user's client (i.e., mobile) device. In still another example where the event is based on proximity to another person, when it is detected that the other person is in proximity to the user, the custom media overlay 602 is added. When it is detected that the other person and the user are no longer in proximity to one another, the custom media overlay 602 is removed.

In some embodiments where it is detected that the event is over or completed, the custom media overlay 602 will be removed from availability for the first subset of users and/or the second subset of users. For example, when the event is based on weather, such as temperature, when the selected temperature is reached, the custom media overlay 602 is added (i.e., made available for use). When the temperature changes from the selected temperature to another temperature, the custom overlay is removed. In another example where the event is based on location, when it is detected that the user is in the selected location, the custom media overlay 602 is added. When it is detected that the user has moved from the selected location to another location, the custom media overlay 602 is removed.

In some embodiments, the user interface also presents an option to remove from availability (for the first subset of users and/or the second subset of users) the custom media overlay after a particular duration of time following activation of the custom media overlay. In the example, the user may select this option by selecting checkbox 620 and entering a time duration into field 622. In the example, the user has not selected checkbox 620. A time duration of 30 minutes has been entered to field 622 but is not active since the corresponding checkbox is not selected. In some embodiments, if it were selected though, the custom media overlay would be removed 30 minutes from the time it was added. In some embodiments, if checkbox 620 is selected, the custom media overlay is removed after a duration from the ending of an event. As an example, if the custom media overlay 602 is associated with a sports event (checkbox 612), then the custom media overlay is removed after a duration (e.g., 30 minutes) beyond the ending of the event. In the case of a custom media overlay being associated with a basketball game, the custom media overlay may be removed 30 minutes after the ending of the game. In embodiments, the ending of the basketball game can be obtained by custom media overlay system 102 via news feeds 152.

The user interface may present checkbox 627 to associate the custom media overlay with one or more groups. The user interface may present field 629 in which the user may enter group(s) of users to which the custom media overlay 602 is to be associated. In embodiments, this option may be used in conjunction with the option provided by checkbox 604 to associate with individual users. Thus, in the example shown in FIG. 6A, the custom media overlay (of the lightbulb image) 602 is associated with the group "School Friends" and user "JeremyG" as users associated with the first subset. Thus, the custom media overlay is made available to the users belonging to the group "School Friends" and user "JeremyG" before the triggering event. Thus, the custom media overlay 602 is associated with a group of profiles formed on a social media system 154 (FIG. 1) titled "School Friends" as well as the user profile of "JeremyG", which the associated respective users control. In implementations, a user may select either the group or a user, or both as shown. In some embodiments, more than one group may be selected, more than one user may be selected, etc.

FIG. 6B is an exemplary user interface 650 for selecting a second subset of users for the custom media overlay. Thus, the custom media overlay 602 is made available to the users indicated therein. The user interface 650 presents field 654 and field 658, and checkboxes 652 and 656. In the example, the user has selected the checkbox 652 associated with group field 654, indicating that the custom media overlay 602 is associated with the group "Boating Club", which may be a group of users interested in boating formed on the social media system 154. In the example, the user has selected the checkbox 656 associated with user field 658, indicating that the custom media overlay 602 is additionally associated with "Willie Magoo" after the triggering event. In implementations, a user may select either the group or a user, or both as shown. In some embodiments, more than one group may be selected, more than one user may be selected, etc.

It should be recognized that the user interfaces shown herein are examples. The content of the user interfaces may vary within the scope of the invention. The mechanisms which appear on the user interfaces through which a user may interact, such as checkboxes, fields, etc., may be substituted with others such as dropdown menus, radio buttons, etc. These are not limiting, and all suitable mechanisms are included.

Figure 7:
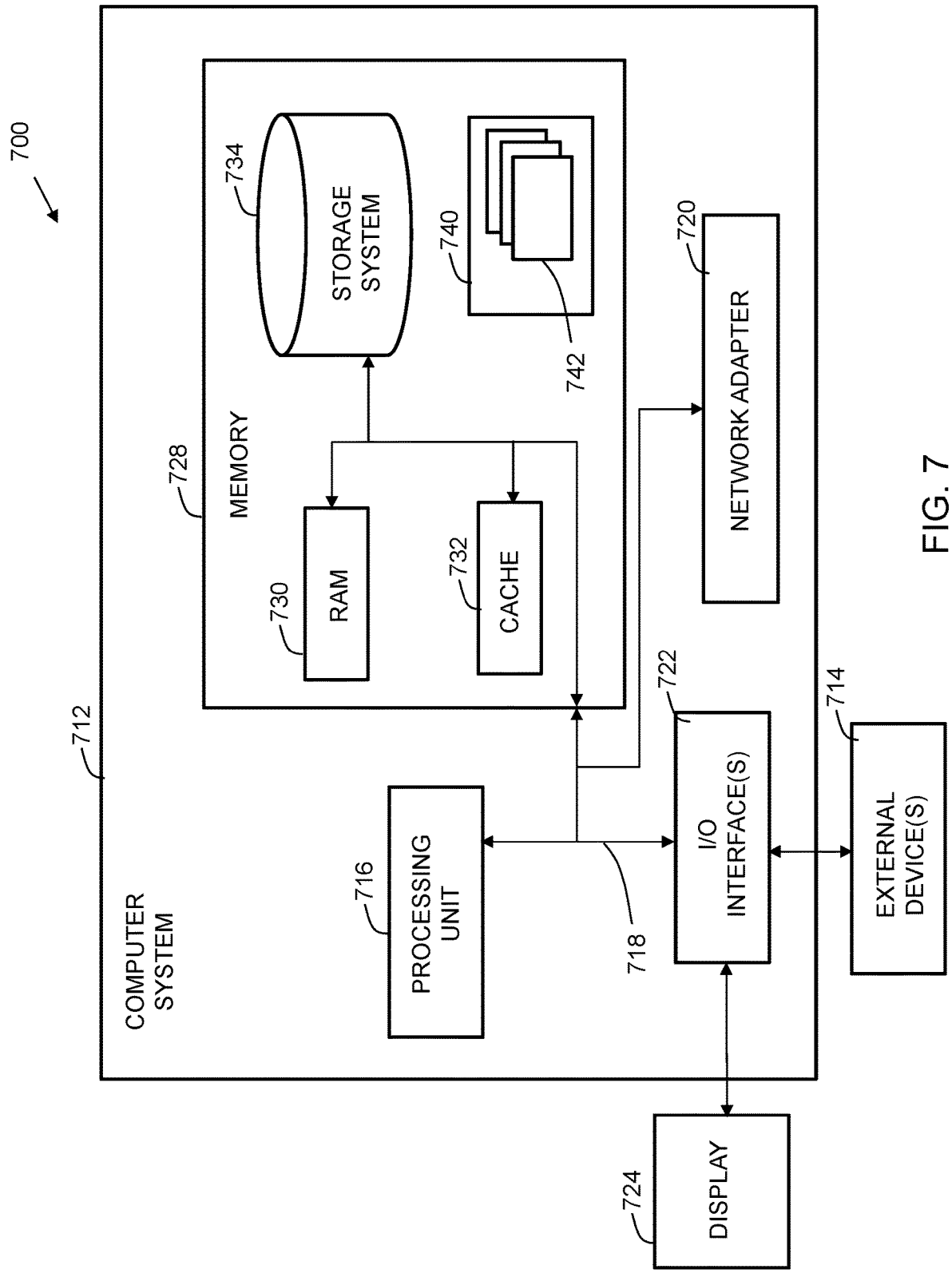
FIG. 7 shows additional details of an embodiment of the present invention.

Referring now to FIG. 7, a computerized implementation 700 of an embodiment for managing custom media overlays for social media applications is described in further detail. Computerized implementation 700 is only one example of a suitable implementation and is not intended to suggest any limitation as to the scope of use or functionality of embodiments of the invention described herein. Regardless, computerized implementation 700 is capable of being implemented and/or performing any of the functionality set forth hereinabove.

In computerized implementation 700, there is a computer system 712. Examples of well-known computing systems, environments, and/or configurations that may be suitable for use with computer system 712 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

This is intended to demonstrate, among other things, that the present invention could be implemented within a network environment (e.g., the Internet, a wide area network (WAN), a local area network (LAN), a virtual private network (VPN), etc.), a cloud computing environment, a cellular network, or on a stand-alone computer system. Communication throughout the network can occur via any combination of various types of communication links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computer system 712 is intended to demonstrate that some or all of the components of implementation 700 could be deployed, managed, serviced, etc., by a service provider who offers to implement, deploy, and/or perform the functions of the present invention for others.

Computer system 712 is intended to represent any type of computer system that may be implemented in deploying/realizing the teachings recited herein. Computer system 712 may be described in the general context of computer system executable instructions, such as program modules, being executed by a computer system. Generally, program modules may include routines, programs, objects, components, logic, data structures, and so on, that perform particular tasks or implement particular abstract data types. In this particular example, computer system 712 represents an illustrative system for gathering time-annotated web interaction and biometric sensor data of web page users to extrapolate emotional responses to a web page and generating an aggregated emotional map indicative of the emotional responses. It should be understood that any other computers implemented under the present invention may have different components/software, but can perform similar functions.

Computer system 712 in computerized implementation 700 is shown in the form of a general-purpose computing device. The components of computer system 712 may include, but are not limited to, one or more processors or processing units 716, a system memory 728, and a bus 718 that couples various system components including system memory 728 to processing unit 716.

Bus 718 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Processing unit 716 refers, generally, to any apparatus that performs logic operations, computational tasks, control functions, etc. A processor may include one or more subsystems, components, and/or other processors. A processor will typically include various logic components that operate using a clock signal to latch data, advance logic states, synchronize computations and logic operations, and/or provide other timing functions. During operation, processing unit 716 collects and routes signals representing inputs and outputs between external devices 714 and input devices (not shown). The signals can be transmitted over a LAN and/or a WAN (e.g., T1, T3, 56 kb, X.25), broadband connections (ISDN, Frame Relay, ATM), wireless links (802.11, Bluetooth, etc.), and so on. In some embodiments, the signals may be encrypted using, for example, trusted key-pair encryption. Different systems may transmit information using different communication pathways, such as Ethernet or wireless networks, direct serial or parallel connections, USB, Firewire®, Bluetooth®, or other proprietary interfaces. (Firewire is a registered trademark of Apple Computer, Inc. Bluetooth is a registered trademark of Bluetooth Special Interest Group (SIG)).

In general, processing unit 716 executes computer program code, such as program code for gathering time-annotated web interaction and biometric sensor data of web page users to extrapolate emotional responses to a web page and generating an aggregated emotional map indicative of the emotional responses, which is stored in memory 728, storage system 734, and/or program/utility 740. While executing computer program code, processing unit 716 can read and/or write data to/from memory 728, storage system 734, and program/utility 740.

Computer system 712 typically includes a variety of computer system readable media. Such media may be any available media that is accessible by computer system 712, and it includes both volatile and non-volatile media, removable and non-removable media.

System memory 728 can include computer system readable media in the form of volatile memory, such as random access memory (RAM) 730 and/or cache memory 732. Computer system 712 may further include other removable/non-removable, volatile/non-volatile computer system storage media, (e.g., VCRs, DVRs, RAID arrays, USB hard drives, optical disk recorders, flash storage devices, and/or any other data processing and storage elements for storing and/or processing data). By way of example only, storage system 734 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 718 by one or more data media interfaces. As will be further depicted and described below, memory 728 may include at least one program product having a set (e.g., at least one) of program modules that are configured to carry out the functions of embodiments of the invention. Program code embodied on a computer readable medium may be transmitted using any appropriate medium including, but not limited to, wireless, wireline, optical fiber cable, radio-frequency (RF), etc., or any suitable combination of the foregoing.

Program/utility 740, having a set (at least one) of program modules 742, may be stored in memory 728 by way of example, and not limitation. Memory 728 may also have an operating system, one or more application programs, other program modules, and program data. Each of the operating system, one or more application programs, other program modules, and program data or some combination thereof, may include an implementation of a networking environment. Program modules 742 generally carry out the functions and/or methodologies of embodiments of the invention as described herein.

Computer system 712 may also communicate with one or more external devices 714 such as a keyboard, a pointing device, a display 724, etc.; one or more devices that enable a consumer to interact with computer system 712; and/or any devices (e.g., network card, modem, etc.) that enable computer system 712 to communicate with one or more other computing devices. Such communication can occur via I/O interfaces 722. Still yet, computer system 712 can communicate with one or more networks such as a local area network (LAN), a general wide area network (WAN), and/or a public network (e.g., the Internet) via network adapter 720. As depicted, network adapter 720 communicates with the other components of computer system 712 via bus 718. It should be understood that although not shown, other hardware and/or software components could be used in conjunction with computer system 712. Examples include, but are not limited to: microcode, device drivers, redundant processing units, external disk drive arrays, RAID systems, tape drives, and data archival storage systems, etc.

As can now be appreciated, disclosed embodiments provide enhanced control of custom media overlays in social media applications. Custom media overlays are published to a larger group of users only when a triggering event has occurred. In this way, an improved user experience is enabled for various applications such as surprise events, and events that are not certain to occur, but have some probability of occurrence. In such cases, disclosed embodiments enable pre-staging of a custom media overlay such that it is ready if the event does occur.

Some of the functional components described in this specification have been labeled as systems or units in order to more particularly emphasize their implementation independence. For example, a system or unit may be implemented as a hardware circuit comprising custom VLSI circuits or gate arrays, off-the-shelf semiconductors such as logic chips, transistors, or other discrete components. A system or unit may also be implemented in programmable hardware devices such as field programmable gate arrays, programmable array logic, programmable logic devices, or the like. A system or unit may also be implemented in software for execution by various types of processors. A system or unit or component of executable code may, for instance, comprise one or more physical or logical blocks of computer instructions, which may, for instance, be organized as an object, procedure, or function. Nevertheless, the executables of an identified system or unit need not be physically located together, but may comprise disparate instructions stored in different locations which, when joined logically together, comprise the system or unit and achieve the stated purpose for the system or unit.

Further, a system or unit of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices and disparate memory devices.

Furthermore, systems/units may also be implemented as a combination of software and one or more hardware devices. For instance, location determination and alert message and/or coupon rendering may be embodied in the combination of a software executable code stored on a memory medium (e.g., memory storage device). In a further example, a system or unit may be the combination of a processor that operates on a set of operational data.

As noted above, some of the embodiments may be embodied in hardware. The hardware may be referenced as a hardware element. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor devices, chips, microchips, chip sets, and so forth. However, the embodiments are not limited in this context.

Also noted above, some embodiments may be embodied in software. The software may be referenced as a software element. In general, a software element may refer to any software structures arranged to perform certain operations. In one embodiment, for example, the software elements may include program instructions and/or data adapted for execution by a hardware element, such as a processor. Program instructions may include an organized list of commands comprising words, values, or symbols arranged in a predetermined syntax that, when executed, may cause a processor to perform a corresponding set of operations.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, may be non-transitory, and thus is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Program data may also be received via the network adapter or network interface.

Computer readable program instructions for carrying out operations of embodiments of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments of the present invention.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

While the disclosure outlines exemplary embodiments, it will be appreciated that variations and modifications will occur to those skilled in the art. For example, although the illustrative embodiments are described herein as a series of acts or events, it will be appreciated that the present invention is not limited by the illustrated ordering of such acts or events unless specifically stated. Some acts may occur in different orders and/or concurrently with other acts or events apart from those illustrated and/or described herein, in accordance with the invention. In addition, not all illustrated steps may be required to implement a methodology in accordance with embodiments of the present invention. Furthermore, the methods according to embodiments of the present invention may be implemented in association with the formation and/or processing of structures illustrated and described herein as well as in association with other structures not illustrated. Moreover, in particular regard to the various functions performed by the above described components (assemblies, devices, circuits, etc.), the terms used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of embodiments of the invention may have been disclosed with respect to only one of several embodiments, such feature may be combined with one or more features of the other embodiments as may be desired and advantageous for any given or particular application. Therefore, it is to be understood that the appended claims are intended to cover all such modifications and changes that fall within the true spirit of embodiments of the invention.

What is claimed is:

1. A computer-implemented method comprising:
defining a custom media overlay in a social media system, wherein the social media system allows users to start accounts, and connect the accounts to other accounts for sharing, wherein there is a first subset of users have user accounts and a second different subset of users have user accounts:
providing a webpage, in a user account of a user, displaying the custom media overlay and a plurality of user-selectable options associated with one or more thresholds for making the custom media overlay available in user accounts of the first subset of users and the second different subset of users, wherein the webpage further comprises a plurality of fields each corresponding to one of the plurality of user-selectable options;
receiving, from the user, a first selection of a first option, from the plurality of user-selectable options, and a first input to a first field, from the plurality of fields, identifying a subject person;
receiving, from the user, a second selection of a second option, from the plurality of user-selectable options, and a second input to a second field, from the plurality of fields, associating the custom media overlay with the first subset of users;
in response to associating the custom media overlay with the first subset of users, displaying the custom media overlay in the user accounts of the first subsets of users;
receiving, from the user, a third selection of a third option, from the plurality of user-selectable options, and a third input to a third field, from the plurality of fields, associating the custom media overlay with the second different subset of users;
determining a predefined proximity to one of the first subset of users;
detecting the identified subject person being within the predefined proximity to one of the first subset of users;
in response to the detecting the identified subject person being within the predefined proximity to one of the first subset of users, displaying the custom media overlay in the user accounts of the second different subset of users, such that the custom media overlay is selectable for use by the second different subset of users for application to a photo displayed in the user accounts of the second different subset of users;
in response to a user from the second different subset of users selects the custom media overlay, applying the custom media overlay over the displayed photo in a user account of the user second different subset of users;
removing the displayed custom media overlay from the accounts of the first subset of users and the second different subsets of users in response to determining that the identified subject person is no longer detected being within the predefined proximity.

2. The method of claim 1, wherein the detecting the subject person within the predefined proximity is based on a social media reporting function.

3. The method of claim 1, wherein the detecting the subject person within the predefined proximity is based on near field communication signals.

4. The method of claim 1, wherein the detecting the subject person within the predefined proximity is based on geolocation signals.

5. The method of claim 1, further comprising:
recording a number of selections of the custom media overlay;
associating the custom media overlay with the subject person in response to the number of selections exceeding a predetermined threshold; and
in response to the association of the custom media overlay with the subject person, providing, via an electronic display, a suggestion to add the custom media overlay to a favorites list.

6. An electronic computing device comprising:
a processor;
a memory coupled to the processor, the memory containing instructions, that when executed by the processor, perform steps of:
defining a custom media overlay in a social media system, wherein the social media system allows users to start accounts, and connect the accounts to other accounts for sharing, wherein there is a first subset of users have user accounts and a second different subset of users have user accounts:
providing a webpage, in a user account of a user, displaying the custom media overlay and a plurality of user-selectable options associated with one or more thresholds for making the custom media overlay available in user accounts of the first subset of users and the second different subset of users, wherein the webpage further comprises a plurality of fields each corresponding to one of the plurality of user-selectable options;
receiving, from the user, a first selection of a first option, from the plurality of user-selectable options, and a first input to a first field, from the plurality of fields, identifying a subject person;
receiving, from the user, a second selection of a second option, from the plurality of user-selectable options, and a second input to a second field, from the plurality of fields, associating the custom media overlay with the first subset of users;
in response to associating the custom media overlay with the first subset of users, displaying the custom media overlay in the user accounts of the first subsets of users;
receiving, from the user, a third selection of a third option, from the plurality of user-selectable options, and a third input to a third field, from the plurality of fields, associating the custom media overlay with the second different subset of users;
determining a predefined proximity to one of the first subset of users;
detecting the identified subject person being within the predefined proximity to one of the first subset of users;
in response to the detecting the identified subject person being within the predefined proximity to one of the first subset of users, displaying the custom media overlay in the user accounts of the second different subset of users, such that the custom media overlay is selectable for use by the second different subset of users for application to a photo displayed in the user accounts of the second different subset of users;
in response to a user from the second different subset of users selects the custom media overlay, applying the custom media overlay over the displayed photo in a user account of the user of the second different subset of users;
removing the displayed custom media overlay from the accounts of the first subset of users and the second different subsets of users availability in response to determining that the identified subject person is no longer detected being within the predefined proximity.

7. The electronic computing device of claim 6, wherein the detecting of the subject person within predefined proximity is based on a social media reporting function.

8. The electronic computing device of claim 6, wherein the detecting the subject person within the predefined proximity is based on near field communication signals.

9. The electronic computing device of claim 6, wherein the memory further comprises instructions, that when executed by the processor, perform the steps of:
recording a number of selections of the custom media overlay;
associating the custom media overlay with the subject person in response to the number of selections exceeding a predetermined threshold; and in response to the association, providing, via an electronic display, a suggestion to add the custom media overlay to a favorites list.

10. A computer program product for an electronic computing device comprising a computer readable hardware storage device having program instructions embodied therewith, the program instructions executable by a processor to cause the electronic computing device to:

define a custom media overlay in a social media system, wherein the social media system allows users to start accounts, and connect the accounts to other accounts for sharing, wherein there is a first subset of users have user accounts and a second different subset of users have user accounts:

provide a webpage, in a user account of a user, displaying the custom media overlay and a plurality of user-selectable options associated with one or more thresholds for making the custom media overlay available in user accounts of the first subset of users and the second different subset of users, wherein the webpage further comprises a plurality of fields each corresponding to one of the plurality of user-selectable options;

receive, from the user, a first selection of a first option, from the plurality of user-selectable options, and a first input to a first field, from the plurality of fields, identifying a subject person;

receive, from the user, a second selection of a second option, from the plurality of user-selectable options, and a second input to a second field, from the plurality of fields, associating the custom media overlay with the first subset of users;

in response to associating the custom media overlay with the first subset of users, display the custom media overlay in the user accounts of the first subsets of users;

receive, from the user, a third selection of a third option, from the plurality of user-selectable options, and a third input to a third field, from the plurality of fields, associating the custom media overlay with the second different subset of users;

determine a predefined proximity to one of the first subset of users;

detecting the identified subject person being within the predefined proximity to one of the first subset of users;

in response to the detecting the identified subject person being within the predefined proximity to one of the first subset of users, display the custom media overlay in the user accounts of the second different subset of users, such that the custom media overlay is selectable for use by the second different subset of users for application to a photo displayed in the user accounts of the second different subset of users;

in response to a user from the second different subset of users selects the custom media overlay, apply the custom media overlay over the displayed photo in a user account of the user second different subset of users;

remove the displayed custom media overlay from the accounts of the first subset of users and the second different subsets of users in response to determining that the identified subject person is no longer detected being within the predefined proximity.

* * * * *